US012783565B2

(12) United States Patent
Lala et al.

(10) Patent No.: US 12,783,565 B2
(45) Date of Patent: *Nov. 3, 2026

(54) NATURAL LANGUAGE UNDERSTANDING BASED DOMAIN DETERMINATION AND FEEDBACK TRAINING BASED ON A RESPONSE SCORE TO DETERMINE A QUERY RESPONSE

(71) Applicant: Intuit Inc., Mountain View, CA (US)

(72) Inventors: Pratik Lala, Mountain View, CA (US); Pooja Rajan Chowdhary, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 18/592,507

(22) Filed: Feb. 29, 2024

(65) Prior Publication Data

US 2025/0278420 A1 Sep. 4, 2025

(51) Int. Cl.

| | |
|---|---|
| ***G06F 16/334*** | (2025.01) |
| ***G06F 16/3329*** | (2025.01) |
| ***G06F 16/383*** | (2019.01) |
| ***G06F 16/9532*** | (2019.01) |
| *G06F 16/2457* | (2019.01) |

(52) U.S. Cl.

CPC ...... *G06F 16/3344* (2019.01); *G06F 16/3347* (2019.01); *G06F 16/383* (2019.01); *G06F 16/24575* (2019.01); *G06F 16/3329* (2019.01); *G06F 16/9532* (2019.01)

(58) Field of Classification Search

CPC ............ G06F 16/3344; G06F 16/3347; G06F 16/3329; G06F 16/383; G06F 16/9532; G06F 16/24575

USPC ........................................................... 706/11

See application file for complete search history.

(56) References Cited

U.S. PATENT DOCUMENTS

| | | | | |
|---|---|---|---|---|
| 2015/0039536 A1* | 2/2015 | Cook | ............... | G06F 16/24575 706/11 |
| 2024/0160675 A1* | 5/2024 | Pham | ................. | G06F 16/9532 |

FOREIGN PATENT DOCUMENTS

| | | | |
|---|---|---|---|
| CN | 113806389 A | * | 12/2021 |

OTHER PUBLICATIONS

Mukherjee, A., et al., "Building an NLU-Powered Search Application with Amazon Sage Maker and the Amazon OpenSearch Service KNN Feature", Oct. 26, 2020, 21 pages.

* cited by examiner

*Primary Examiner* — Farzad Kazeminezhad
(74) *Attorney, Agent, or Firm* — Lathrop GPM LLP

(57) ABSTRACT

A method includes generating a user query embedding for a user query received from a user, generating a domain intent list comprising at least one vector index, selecting at least one vector structure corresponding to the at least one vector index to obtain a set of selected vector structures from a plurality of vector structures in a vector store, obtaining at least one result embedding wherein the at least one result embedding matches the user query embedding, transmitting the user query and the at least one result embedding to an answer generation model and receiving the answer to the user query.

9 Claims, 8 Drawing Sheets

705

| Query 706 | Intent 708 |
|---|---|
| What's the weather in NYC? | Weather |
| How do I reset my password? | Password_Reset |
| What's the difference between a latte and a cappuccino? | Coffee_Information |
| How do I change the language settings on my phone? | Phone_Settings |
| What movies are playing at the cinema tonight? | Entertainment |
| Can you help me schedule a meeting with my team? | Work_Scheduling |
| Where can I find the best sushi in town? | Find_Restaurant |
| What's the status of my order? | Order_Status |
| How do I track my package? | Package_Tracking |
| What are the requirements for applying to your university? | University_Admissions |
| How do I cancel my subscription? | Cancellation_Subscription |

*FIG. 7A*

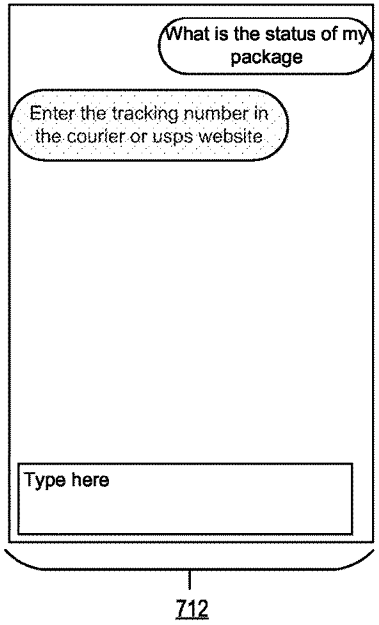

*FIG. 7B*

NATURAL LANGUAGE UNDERSTANDING BASED DOMAIN DETERMINATION AND FEEDBACK TRAINING BASED ON A RESPONSE SCORE TO DETERMINE A QUERY RESPONSE

BACKGROUND

Enterprise environments may have varied forms of data accessible to users, accessible across various platforms. Users may interact in a request and response dialogue mode with enterprise environments using natural language. Because natural language is used, at the enterprise side, language models may be used to interpret the user's request and formulate or generate a response. In certain situations, large language models mischaracterize the user's request. For example, the large language model may not understand what the user is intending to ask in the request. Consequently, the large language model may return a response that is irrelevant or wrong.

SUMMARY

In general, in one aspect, one or more embodiments related to a method. The method includes generating, by an embedding model, a user query embedding for a user query received from a user. The method further includes generating, by a natural language understanding (NLU) engine processing the user query embedding, a domain intent list comprising at least one vector index. Furthermore, the method includes selecting, by a user query answer service, from a plurality of vector structures in a vector store, at least one vector structure corresponding to the at least one vector index to obtain a set of selected vector structures and obtaining, from the set of selected vector structures, at least one result embedding, wherein the at least one result embedding matches the user query embedding. Additionally, the method includes transmitting, by the user query answer service to an answer generation model, the user query and the at least one result embedding, and further, receiving, by the user query answer service from the answer generation model, the answer to the user query.

In general, in one aspect, one or more embodiments relate to a system. The system includes a user query answer service. The user query answer service includes a natural language understanding (NLU) engine, and an embedding model. The system further includes a data repository. The data repository includes a user query repository, a vector store, and at least one content domain store; Furthermore, the system includes an answer generation model. The embedding model is configured to generate a user query embedding for a user query received from a user. The NLU engine is configured to process the user query embedding by generating, a domain intent list comprising at least one vector index. The user query answer service is configured to select at least one vector structure corresponding to the at least one vector index, from a plurality of vector structures in the vector store, to obtain a set of selected vector structures. Further, the user query answer service is configured to obtain, from the set of selected vector structures, at least one result embedding, wherein the at least one result embedding matches the user query embedding. Furthermore, the user query answer service is configured to transmit the user query and the at least one result embedding to the answer generation model and receive the answer to the user query from the answer generation model.

In general, in one aspect, one or more embodiments relate to a method. The method includes generating, for a user query embedding, a domain intent list comprising at least one vector index, determining a confidence score of the domain intent list, selecting at least one vector structure corresponding to the at least one vector index to obtain a set of selected vector structures from a plurality of vector structures in a vector store, obtaining at least one result embedding from the set of selected vector structures, wherein the result embedding matches the user query embedding, generating a result similarity score corresponding to the result embedding, determining an index similarity score corresponding to the vector index based on the result similarity score, determining a composite score corresponding to the vector index based on the confidence score of the domain intent list and the index similarity score of the vector index, transmitting the user query and the embedding to an answer generation model if the composite score is higher than a composite score threshold, and receiving the answer to the user query from the answer generation model.

Other aspects of the invention will be apparent from the following description and the appended claims.

BRIEF DESCRIPTION OF DRAWINGS

FIG. 7A is a data structure illustrating a labeled dataset, in accordance with one or more embodiments.

FIG. 7B depicts an example of an interaction between a user and an automated response system, in accordance with one or more embodiments.

Like elements in the various figures are denoted by like reference numerals for consistency.

DETAILED DESCRIPTION

In general, embodiments are directed to determining the intent of a user query in natural language before transmitting the user query to a language model. The intent is the goal or purpose of the user query. The intent relates to one or more specific content domains that may not be explicitly specified in the user query. The content domains are the possible topics or subject areas. One or more embodiments include a natural language understanding (NLU) model that is trained to predict the intent of the user query by processing the user query. Specifically, the NLU model narrows the number of possible content domains to only the content domains that are relevant to the predicted intent of the user query. Thus, when the language model processes the user query, the language model uses the relevant content domain to generate a more relevant natural language answer to the user query.

Other aspects of the system and method to determine the intended content domain corresponding to a user query are described in the Figures and relevant portions of the current specification.

A user query is a question, exclamation, or statement from a user, whether written or oral. A user query may include one or more utterances. An utterance is an uninterrupted chain of spoken or written natural language. The term "utterance" pertains to anything spoken or written by a user that starts and ends with a pause.

Figure 1:
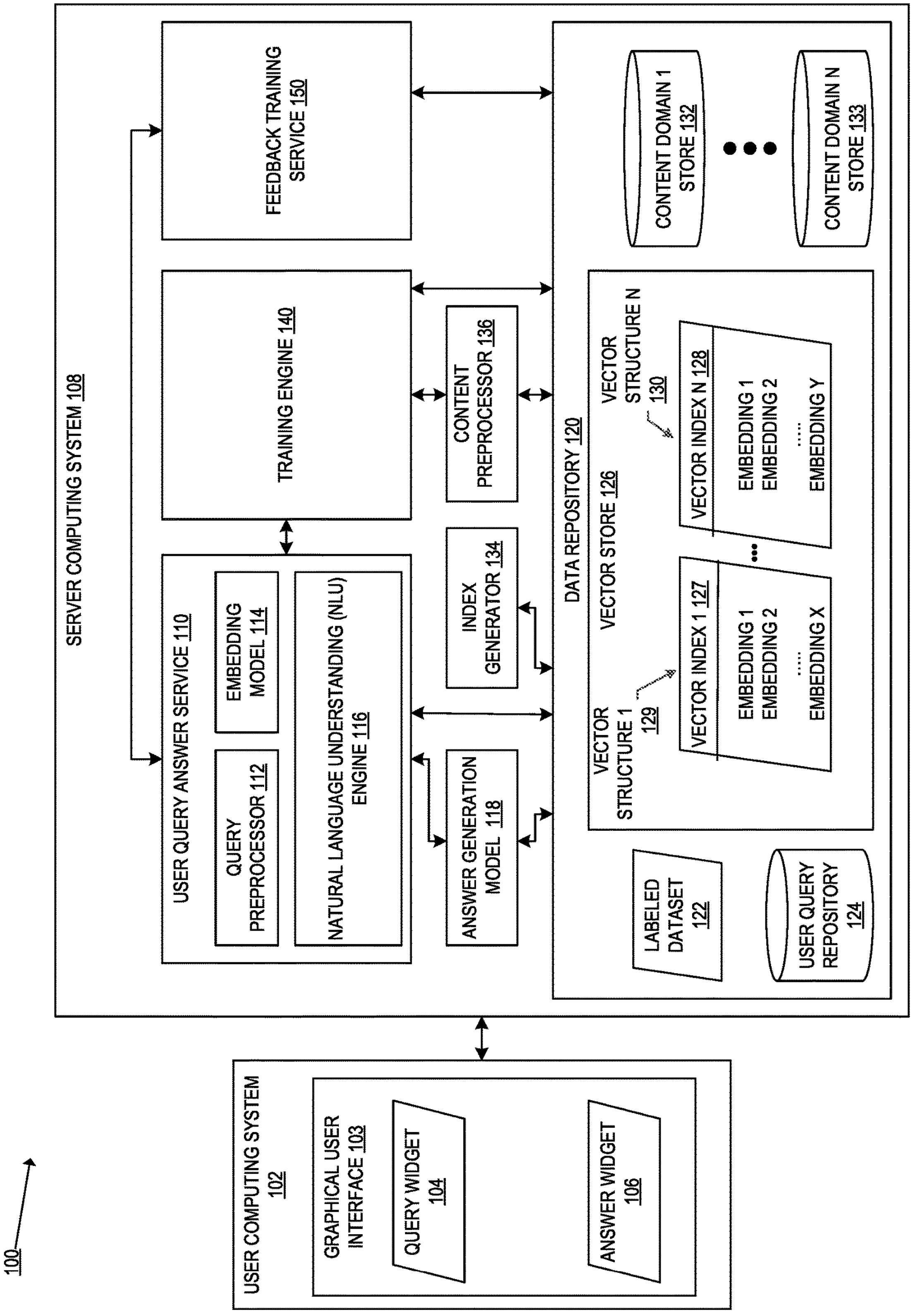
FIG. 1 is a diagram of a system in accordance with one or more embodiments.

Turning to the Figures, FIG. 1 shows a diagram of a system (100) that illustrates an embodiment of a server computing system (108) communicatively coupled to a user computing system (102). The server computing system includes a data repository (120), a user query answer service (110), a training engine (140), a feedback training service (150), and an answer generation model (118). Each of these components is described herein.

The user computing system (102) is a computing system configured to present a graphical user interface (103) to a user. In one embodiment, the graphical user interface includes at least one query widget (104) for entering written or spoken user queries by a user. The query widgets present the user with graphical artifacts that are configured to receive the user query in a natural language. The term, natural language, comports with the standard definition used in the art to refer to a language developed naturally, rather than computer coding language. Some examples of query widgets (104) include forms, chatbots, dialog boxes and variations thereof. The graphical user interface (103) includes at least one answer widget (106) that presents results from the server computing system (108). The answer widget (106) may be configured to display the results. The answer widget (106) may also include interactive graphical artifacts that are configured to receive a selection from a user to provide feedback on the results. For example, the interactive graphical artifacts may include a checkbox, button, or other interactive visualization artifacts to rate or rank the presented results based on the relevance of the results to the user query.

The server computing system includes a data repository (120). The data repository is any type of storage unit and/or device (e.g., a file system, database, data structure, or any other storage mechanism) for storing data. Further, the data repository may include multiple different, potentially heterogeneous, storage units and/or devices.

In one embodiment, the data stored by the data repository includes content domain stores (e.g., content domain 1 store (132), content domain N store (133)). The content domain store is a storage structure that stores the content of a single particular domain. For example, the content in the content domain store may be documents, such as text and image, Javascript Object Notation (JSON) files, database records, or any other unstructured or structured documents. By way of example, content domain 1 store (132) may include content pertaining to the code base of a software development environment in an enterprise while content domain N store (133) may include content pertaining to journal articles or an enterprise wiki. A wiki is a database for creating, browsing, and searching through information contained in pages. Wikis are knowledge management resources and serve as community websites and intranets in some instances.

The data repository includes a vector store (126). The vector store (126) is a specialized database that stores vector structures (e.g., vector structure 1 (129), vector structure N (130)). The vector store (126) is configured to perform vector searches. Examples of vector stores include Pgvector, Pinecone, Qdrant, and other extant variations. Other examples include ElasticCloud® and OpenSearch, which provide full vector databases, and may be used for vector search and similarity search.

The vector structure (e.g., vector structure 1 (129), vector structure N (130)) is a data structure that includes a set of embeddings and a vector index (e.g., vector index 1 (127), vector index N (128)) for a particular corresponding content domain store (e.g., content domain 1 store (132), content domain N store (133)). In one embodiment, a one-to-one relationship exists between vector structures and content domain stores.

For example, vector structure 1 (129) includes at least one embedding (e.g., embeddings 1 through X) and a vector index 1 (127). Similarly, vector structure N (130) includes at least one embedding (e.g., embeddings 1 through Y) and vector index N (128).

The vector index is a unique index identifier of the corresponding content domain store. Vector index 1 (127) through vector index N (128) correspond to content domain stores content domain 1 (132) through content domain N (133). In other words, the vector index of a vector structure identifies the matching content domain store from which the embeddings of the vector are generated. For example, vector structure 1 (129) includes embeddings 1 through X and vector index 1 (127). The vector index 1 (127) is a unique index identifier identifying content domain 1 (132). Accordingly, embeddings 1 through X of vector 1 (129) are generated from the content in content domain 1 (132).

An embedding is the mathematical vector that is the representation of a word or phrase. In the context of the vector store, embeddings are pre-computed and stored in the corresponding vector structure. Embeddings may be used to quickly access and compare the similarity between different phrases or words. Thus, searching the vector store with a query embedding of a user query yields result embeddings that are similar to the user query. In the current specification, the term "match" between a user query embedding and a result embedding refers to greater than a threshold degree of similarity between the user query embedding and the result embedding.

The embeddings in the vector store (126) are characterizations or representations of natural language constructs, for example, phrases, or words. In one embodiment, an embedding is a mathematical representation of a word or phrase that captures the meaning and context of the word or phrase. Embeddings are used in NLU and machine learning (ML) to analyze and understand text data. In one embodiment, an embedding corresponds to an utterance from the content in a content domain store. The embedding may be a low-dimensional continuous vector representation of discrete variables. Converting utterances in the user query to embeddings and other similar vector representations provide machine learning models with a better understanding of relationships between words.

The data repository further includes a user query repository (124). In one embodiment, the user query repository (124) stores historical data including past user queries, query embeddings, domain intent lists, result embeddings obtained from the vector store that correspond to the past user queries, and result similarity scores corresponding to the result embeddings. In one or more embodiments, the user query repository (124) may further include human-selected domain intent lists corresponding to certain user queries.

The data repository further includes a labeled dataset (122). In one embodiment, the labeled dataset (122) is used as a training dataset. The labeled dataset (122) includes at least one user query and at least one corresponding domain intent list. The at least one user query has a known intent. The domain intent list includes at least one vector index. The at least one vector index identifies the content domain store that is the known intent of the user query. In particular, the at least one vector index corresponds to a vector structure that contains embeddings corresponding to the content in a content domain store that is identified, by the vector index, as the known intent of the user query. In one example, a user query of the labeled dataset (122) may be the request "Can you help me schedule a meeting with my team". The corresponding domain intent list may contain the vector index "Work_Scheduling". The vector index corresponds to a vector structure in the vector store that contains embeddings for the content in the content domain store "Work_Scheduling".

Continuing with the server computing system, the user query answer service (110) includes a query preprocessor (112), embedding model (114), and an NLU engine (116). The user query answer service (110) is operatively coupled to an answer generation model (118), training engine (140), the data repository (120), and feedback training service (150). In one embodiment, the user query answer service includes computer-implemented code and programs to orchestrate the components (112), (114) and (116) at runtime to generate an answer to the user query. Further, the user query answer service (110) is configured to receive a user query from the user computing system. Additionally, the user query answer service (110) is configured to transmit a natural language answer to the user computing system. The user query answer service may be a standalone application, part of another application, a service connected to one or more applications, or another type of software. The components (112), (114) and (116) are described in further detail with reference to FIG. 1.

The query preprocessor (112) of the user query answer service is configured to preprocess a received user query. The query preprocessor (112) is operatively coupled to the embedding model (114). The system 100 shows the query preprocessor (112) as a component of the user query answer service. In one or more embodiments (not shown), the query preprocessor may be an independent component in the server computing system, a remote component that is communicatively coupled to the server computing system and variations thereof. In one embodiment, the query preprocessor is configured to clean and tokenize the user query. Tokenizing the user query extracts an ordered sequence of tokens from the user query. The tokenization may be based on a white space or dictionary. Cleaning the user query may be to remove stop words and other tokens that may result in an inaccurate embedding generation.

The query preprocessor (112) is operatively coupled to an embedding model (114). The embedding model (114) is operatively coupled to the training engine (140) via the user query answer service. The system (100) shows the embedding model (114) as a part of the user query answer service (110). In one or more embodiments (not shown), the embedding model (114) may be an independent component in the server computing system (108), a remote component that is communicatively coupled to the server computing system (108) and variations thereof.

The embedding model (114) is configured to generate an embedding of one or more utterances. For example, the embedding model (114) may be Universal Sentence Encoder (USE), Word2Vec, GloVE, BERT, FastText, convolutional neural networks VGG, Inception and other variations thereof.

The NLU engine (116) is a NLU machine learning model. In general, NLU models, or engines, may help machines to understand and analyze natural language by extracting metadata from content such as concepts, entities, keywords, emotion, relations, and semantic roles. NLU models use syntactic and semantic analysis of speech and text to determine the meaning of a user query. The NLU engine (116) is operatively coupled to the embedding model (114). Further, the NLU engine (116) is operatively coupled to the training engine (140), and the feedback training service (150) via the user query answer service (110). The system (100) shows the NLU engine (114) as a part of the user query answer service (110). In one or more embodiments, the NLU engine (116) may be an independent component in the server computing system, a remote component that is communicatively coupled to the server computing system and variations thereof.

In one embodiment, the NLU engine (116) is trained to generate a domain intent list in response to the user query in a runtime environment. The domain intent list includes at least one vector index. Namely, the NLU engine (116) is trained to directly output one or more vector indices from a preprocessed user query. The one or more vector indices that are directly outputted corresponds to the NLU engine's predicted intent of the user query. In one embodiment, the NLU engine (116) generates a confidence score for the domain intent list. The confidence score represents the NLU engine's (116) confidence in predicting the intent of the user query with respect to the domain to which the user query is directed. Some examples of the NLU engine (116) include Spacy, Snips, Flair, DeepPavlov and the like.

In continuing reference to FIG. 1, the server computing system includes a training engine (140). The training engine (140) is operatively coupled to the data repository, the content preprocessor and the NLU engine via the user query answer service. In one embodiment, the training engine (140) is configured to train the NLU engine with a labeled dataset during a training phase to output a domain intent list. The domain intent list includes at least one vector index. Additionally, in one embodiment, the training engine (140) is configured to populate the vector store (126) in the data repository (120). Furthermore, the training engine (140) is configured to receive content from the content pre-processor (136). The training engine may be a standalone application, part of another application, a service connected to one or more applications, or another type of software.

The server computing system (108) includes the feedback training service (150) of the server computing system. The feedback training service (150) may be operatively coupled to the NLU engine (116) via the user query answer service (110). Further, the feedback training service (150) is operatively coupled to the data repository. In one embodiment, the feedback training service (150) is configured to re-train the NLU engine during runtime. Furthermore, the feedback training service (150) trains the NLU engine (116) with one or more labeled datasets including at least one user query and a corresponding domain intent list. The feedback training service may be a stand-alone application, part of another application, a service connected to one or more applications, or another type of software.

The server computing system (108) includes an answer generation model (118). The answer generation model (118) is operatively coupled to the user query answer service (110) and the data repository (120). In one embodiment, the answer generation model (118) is configured to generate an answer to the user query in natural language. The answer generation model (118) is further configured to use the user query and at least one result embedding to generate an answer for a user query. In one example, the answer generation model (118) is a large language model. Large language models include BERT-Large, GPT-2, GPT-3, and the like.

The server computing system includes a content preprocessor (136). The content preprocessor is operatively coupled to the training engine and the data repository. In one embodiment, the content preprocessor (136) ingests the content from the content domain stores. Ingesting data entails retrieving and processing raw data from disparate sources. The content preprocessor may be further configured to clean and tokenize and convert the content into natural language. In one example, the content preprocessor is configured to convert JSON documents to natural language documents. The server computing system includes an index generator (134). In one embodiment, the index generator (134) is operatively coupled to the vector store. Further, the index generator (134) is configured to generate a vector index for each vector structure in the vector store.

While FIG. 1 shows a configuration of components, other configurations may be used without departing from the scope of the invention. For example, various components may be combined to create a single component. As another example, the functionality performed by a single component may be performed by two or more components.

FIGS. 2 through 5 show flowcharts in accordance with one or more embodiments. The flowcharts may be performed by the components described in reference to in FIG. 1. While the various steps in these flowcharts are presented and described sequentially, at least some of the steps may be executed in different orders, may be combined, or omitted, and at least some of the steps may be executed in parallel. Furthermore, the steps may be performed actively or passively.

Figure 2:
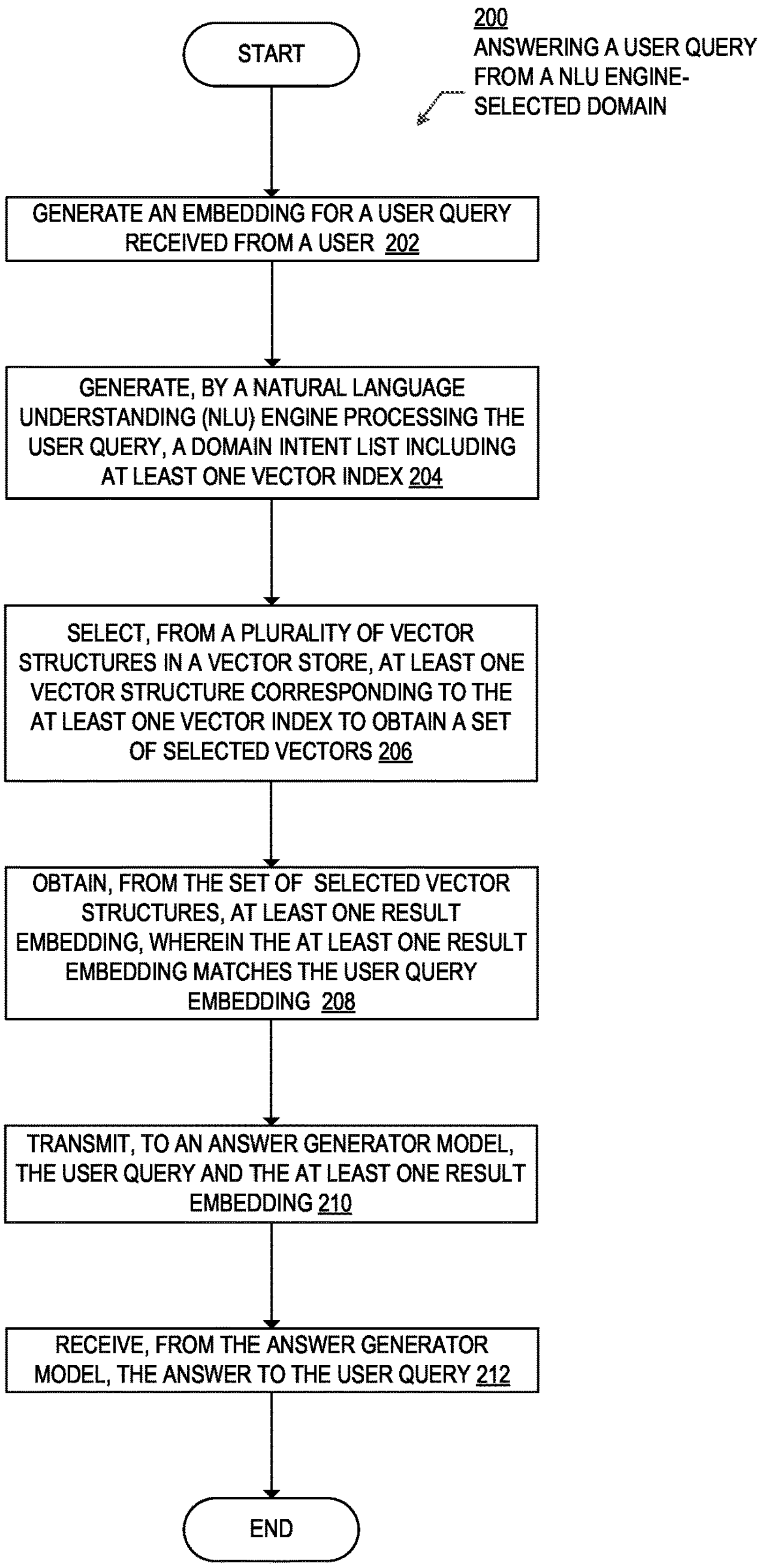
FIG. 2 is a flowchart for generating an answer to a query in accordance with one or more embodiments.

FIG. 2 shows a flowchart of a method 200 for answering a user query from an NLU engine-selected domain. In Block 202, a user query is received from a user and an embedding for the user query is generated. The user submits one or more utterances forming the user query into a query widget. The one or more utterances are transmitted to the server computing system. In one embodiment, the user query answer service receives the user query from the user computing system and triggers the query preprocessor to preprocess the query. Subsequently, the user query answering service triggers the embedding model to generate a query embedding for the preprocessed user query.

In Block 204, a domain intent list including at least one vector index is generated by the NLU engine by processing the user query. In one embodiment, the user query answer service may trigger the NLU engine to generate the domain intent list for the user query. The NLU engine processes the natural language query to generate a domain intent list including a set of one or more vector indices.

In Block 206, a set of vector structures is selected from the vector store. Each vector structure in the set of selected vector structures corresponds to a vector index from the domain intent list. In one embodiment, the user query answer service selects the vector structures corresponding to the vector indices in the domain intent list, to subsequently search the selected vector structures for result embeddings that match the user query embedding obtained in Block 202.

In Block 208, at least one result embedding matching the user query embedding is obtained from the set of selected vector structures. In one embodiment, the user query answer service obtains the at least one result embedding from the vector store.

In Block 210, the user query and the at least one result embedding obtained in Block 208 are transmitted to the answer generation model. In one embodiment, the user query answer service transmits the user query and the at least one result embedding to the answer generation model. The answer generation model generates an answer to the user query based on the at least one result embedding.

In Block 212, the answer to the user query is received. In one embodiment, the user query answer service receives the answer from the answer generation model. The answer is transmitted back to the user.

Figure 3:
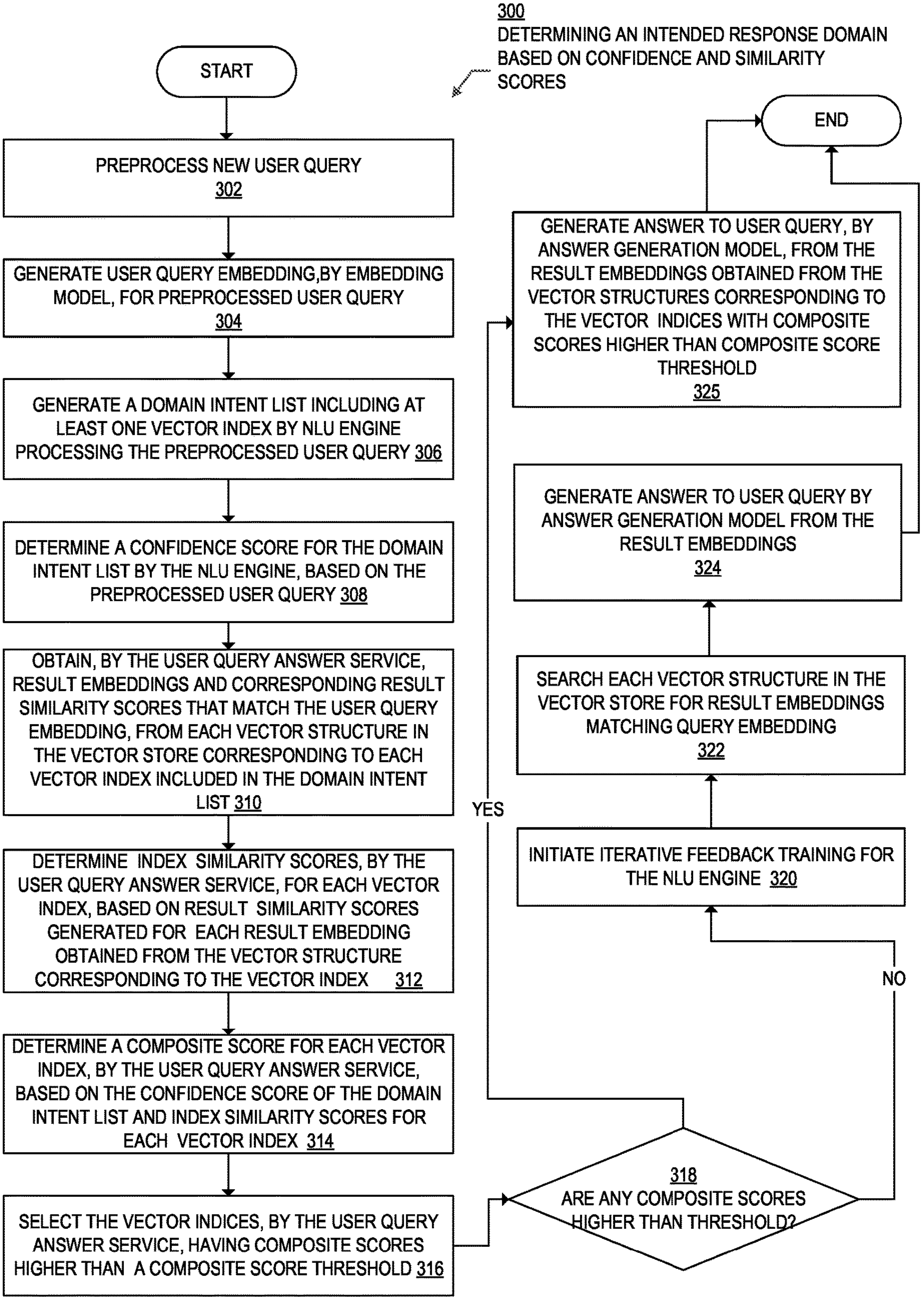
FIG. 3 is a flowchart for generating an answer to a query based on a composite score, in accordance with one or more embodiments.

FIG. 3 shows a flowchart for a method 300 of determining an intended response domain using confidence and similarity scores. The method 300 uses scores to rate results and the domain intent list. The method 300 entails the calculation of a composite score and a comparison of the composite score to a composite score threshold. The method 300 further entails the initiation of the iterative feedback training process of the NLU engine at runtime, thereby implementing a continuous learning process for the NLU engine. The continuous learning process whereby the NLU engine learns intended or preferred domains for answer generation from new queries and user interactions improves the quality, relevance, and accuracy of the generated answer. Method 300 of FIG. 3 is described in detail herein.

The method 300 starts at Block 302. In Block 302, a new user query is preprocessed. The preprocessing step is undertaken to tokenize and clean the user query and convert the user query to a suitable format for further query processing. In one embodiment, the query preprocessor of the user query answering service performs the step in Block 302.

In Block 304, an embedding is generated by the embedding model for the preprocessed user query from Block 302. In one embodiment, the user query answer service orchestrates the embedding model to generate the embedding from the preprocessed user query. The embedding model generates an embedding for the user query by mapping the words in the query to a vector space where each word is represented by a vector. The vectors are generated using a mathematical algorithm that captures the meaning and context of the words based on their surrounding words in the text. The generated vectors are combined to create an embedding for the user query. The resulting embedding is a mathematical representation of the meaning and context of the user's query that can be used for further analysis or processing.

In Block 306, the preprocessed user query from Block 302 is passed to the NLU engine. A domain intent list is generated by the NLU engine based on the NLU engine's prediction of the intent of the preprocessed user query. In one or more embodiments, the NLU engine may use various techniques such as statistical models, rule-based systems, and machine learning to predict the intent of a user query. In one embodiment, the NLU engine is trained to predict the intent of the user query. The labeled dataset obtained from the user query repository may be used to train the NLU engine. Subsequently, the trained NLU engine generates a domain intent list based on the predicted intent of the user query, populated with at least one vector index. The at least one vector index corresponds to a vector structure in the vector store including embeddings that are representations of the content from a content domain store in the data repository.

In Block 308, a confidence score for the domain intent list is calculated by the NLU engine. The confidence score for the domain intent list is a measure of the confidence of the prediction of the intent of the user query by the NLU engine.

By way of an example, the NLU engine may receive a user query "What are the requirements for applying to your university?". The NLU engine may generate a domain intent list with a single vector index "University_Admissions" in response to the user query. The NLU engine may compute the confidence score of the domain intent list to be 90%.

In Block 310, result embeddings and corresponding result similarity scores that match the user query embedding are obtained by the user query answer service. In one embodiment, the user query answer service sends a request to the vector store with at least the user query embedding obtained in Block 304 and the domain intent list obtained in Block 306. The vector store selects the vector structures corresponding to the vector indices in the domain intent list and searches the selected vector structures to obtain result embeddings that are most similar to the user query embedding. Additionally, the vector store generates a result similarity score for each result embedding. The result similarity score of a result represents the accuracy and relevance of the result embedding match to the query embedding. In one embodiment, the vector store determines the similarity of a result embedding to the query embedding through top-K matching. Top-K matching is an algorithm that returns the top K elements from a collection of elements based on a certain criterion. The criterion may include a highest score, a most frequent element, or the most relevant search result. Further, in one or more embodiments, the top-K matching algorithm may rank the relevancy of the result using selection, sorting, or other heuristic algorithms. In one or more embodiments, the vector store may use Hierarchical Navigable Small World (HNSW), FLAT (brute force algorithm), Non-Metric Space Library (NMSLIB) and the like. Furthermore, in one embodiment, the vector store returns the result embeddings and the corresponding result similarity scores to the user query answer service.

Turning to Block 312, index similarity scores are generated by the user query answer service, for each vector index in the domain intent list, based on the result similarity score corresponding to each result embedding obtained from the vector structure corresponding to the vector index. For example, in FIG. 1, embedding 1 and embedding 2 from vector structure 1 may be result embeddings that are obtained as top K matches to the user query embedding. Accordingly, the index similarity score for vector index 1 is calculated based on the result similarity scores corresponding to embedding 1 and embedding 2. In one embodiment, the user query answer service is configured to calculate the index similarity score of a vector index.

Continuing to Block 314, a composite score is determined for each vector index of the selected set of vector structures. In one embodiment, the user query answer service computes the composite score based on the confidence score of the domain intent list and the index similarity score for the vector index. In one embodiment, the composite score for a vector index is a weighted average of the vector index score calculated in Block 312 and the confidence score determined in Block 308. In another embodiment, the user query answer service uses the confidence score determined in Block 308 as a weighted multiplier for each result similarity score corresponding to the vector index. The user query answer service subsequently takes a weighted average of the result similarity scores to obtain the final composite score for the vector index. The weightage given to the confidence score multiplier may be human-determined or may be determined dynamically in the runtime environment.

In Block 316, a composite score threshold is used to select vector indices having composite scores calculated in Block 314. In one embodiment, a vector index is selected if the composite score corresponding to the vector index is higher than the composite score threshold. In one or more embodiments, the user query answer service may be configured to determine the composite score threshold. In one embodiment, the composite score threshold is human configured via configuration data pertaining to the user query answer service. In another embodiments, the composite score threshold is configured via a GUI presented to the user.

In Block 318, a comparison step is performed. Control is passed to Block 325 if at least one vector index has a composite score that is higher than the composite score threshold. If at least one vector index does not have a composite score that is higher than the composite score threshold, control is passed to Block 320 if no vector index has a composite score that is higher than the composite score threshold. In one embodiment, the user query answer service is configured to perform the comparison step of Block 318 and orchestrate the alternate control pathways.

In Block 320, an iterative feedback training for the NLU engine is initiated. In one embodiment, the user query answering service is configured to launch the feedback training service. In one or more embodiments, the feedback training service may be configured to run as a background process, activated by the user query answer service on an as-needed basis. Namely, the process may be activated when comparison step of Block 318 determines that no vector index has a composite score that is higher than the composite score threshold.

In Block 322, a fallback step is performed. In one or more embodiments Block 322 may be executed after, before or in parallel with Block 320. FIG. 3 shows Block 322 as being executed subsequent to Block 320. At Block 322, all the vector structures in the vector store are searched to obtain result embeddings that are top K matches for the user query embedding, as a fallback step. In one embodiment, the user query answer service sends a request to the vector store with at least the user query embedding. The vector store searches each vector structure in the vector store to obtain result embeddings and returns the result embeddings to the user query answer service.

In Block 324, the answer to the user query is generated by the answer generation model. In one embodiment, the user query answer service provides the result embeddings obtained from Block 322 as input data to the answer generation model. By way of example, the answer generation model may include answer generation functionality that may be exposed via an application programming interface (API) invokable via computer program code to generate answers in natural language using embeddings as input parameters. Subsequently the answer is transmitted to the user.

In Block 325, the answer to the user query is generated by the answer generation model. In one embodiment, the user query answer service provides the result embeddings obtained from Block 310, from the vector structures corresponding to those vector indices that have composite scores higher than the composite score threshold, as input to the answer generation model. By way of example, the answer generation model may include answer generation functionality that may be exposed via an application programming interface (API) invokable via computer program code to generate answers in natural language using embeddings as input. Subsequently the user query answer service transmits the answer to the user.

Figure 4:
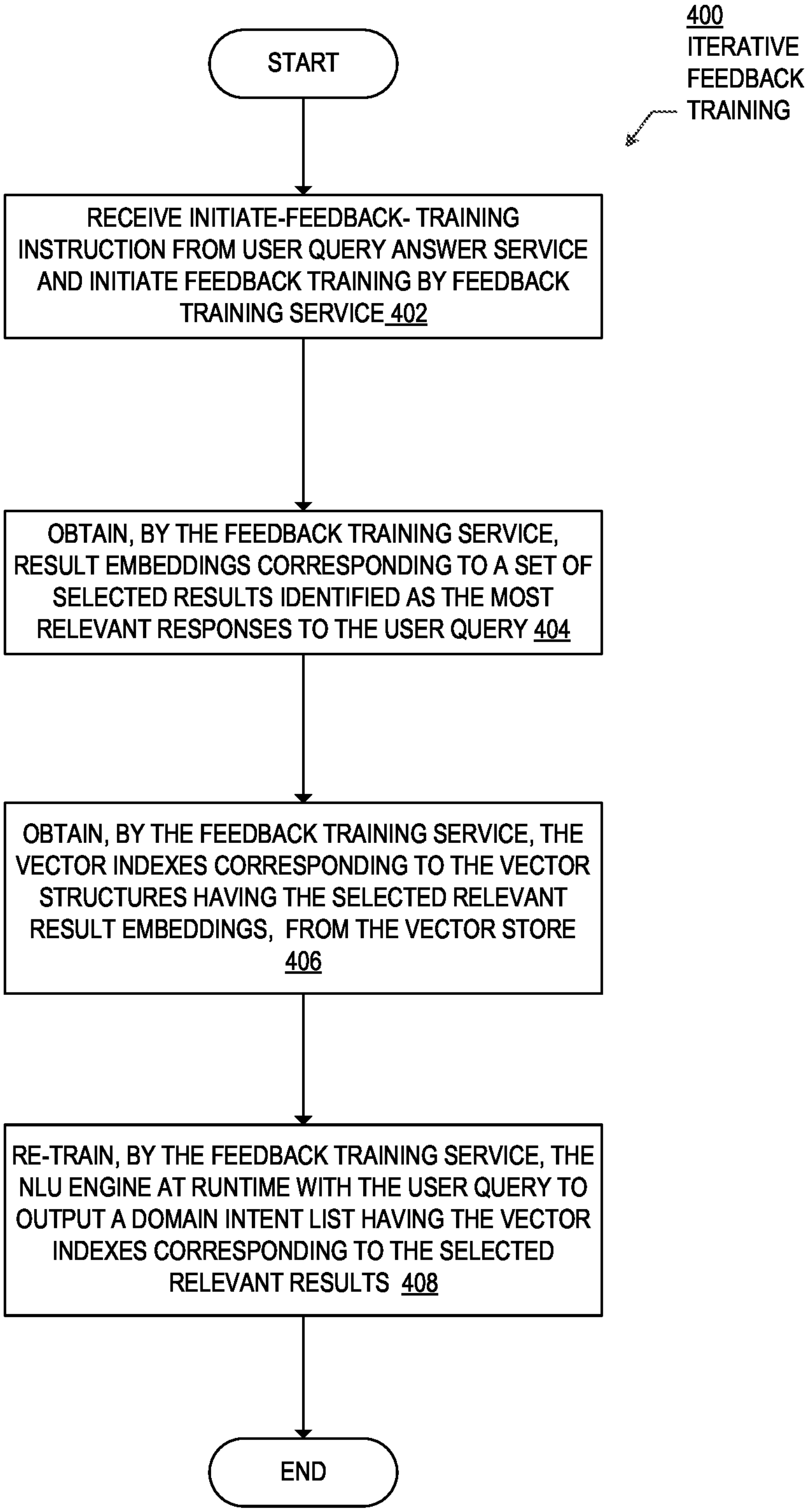
FIG. 4 is a flowchart for an iterative feedback loop at runtime, in accordance with one or more embodiments.

FIG. 4 shows a flowchart depicting a method 400 for iterative feedback training of the NLU engine. The method 400 is described in reference to the components of FIG. 1. In one embodiment, various Blocks of the method 400 of FIG. 4, in particular, Blocks 402 through 408, are performed by one or more of the feedback training service and the user query answering service.

In Block 402, the iterative feedback training process is initiated by the feedback training service. In one embodiment, the user query answer service is configured to activate the feedback training service.

In Block 404, result embeddings corresponding to a set of selected results are obtained, by the feedback training service. The selected results are determined to be the most relevant responses to the user query. In one embodiment, the user query answer service provides the result embeddings to the feedback training service. Further, in one or more additional embodiments, the user may perform the step of determining at least one relevant response to the user query via the GUI of the user computing system. The GUI may be configured for the user to choose at least one result that is determined to be most relevant response to the user. In one or more additional embodiments, subject matter experts may manually select a result as the most relevant response to the user query. Subsequently, the user query answering service may receive at least one manually selected result as the most relevant response from the user computing system. The user query answering service may subsequently send the user query and at least one result embedding corresponding to the at least one manually selected result to the feedback training service.

In Block 406, at least one vector index corresponding to the at least one result embedding received by the feedback training service in Block 404 is obtained from the vector store by the feedback training service. In one embodiment, the feedback training service sends a request to the vector store with the result embedding. The vector store searches the vector structures for the result embedding and returns a vector index corresponding to the vector structure that has a match for the result embedding. By way of example, from FIG. 1, the user selects a result via the GUI of the user computing system for which the corresponding result embedding matches embedding 2 (from vector structure 1). The user query answer service sends the result embedding to the feedback training service. Subsequently, the feedback training service sends a request to the vector store with the result embedding. The vector store searches the vector structures and finds a match, namely, embedding 2, in vector structure 1. Subsequently, the vector store returns vector index 1 from vector structure 1 to the feedback training service.

In Block 408, the NLU engine is trained by the feedback training service using the user query as input to return, as output, a domain intent list including the at least one vector index obtained in Block 406. The re-training of the NLU engine at runtime optimizes the NLU engine to improve continuously in intent prediction of a user query. In one or more embodiments, the feedback training service may run as a continuous background process on the server computing system to implement the training of the NLU engine at runtime. In other embodiments, the feedback training service may run the training process as a periodically performed batch process during runtime.

Figure 5:
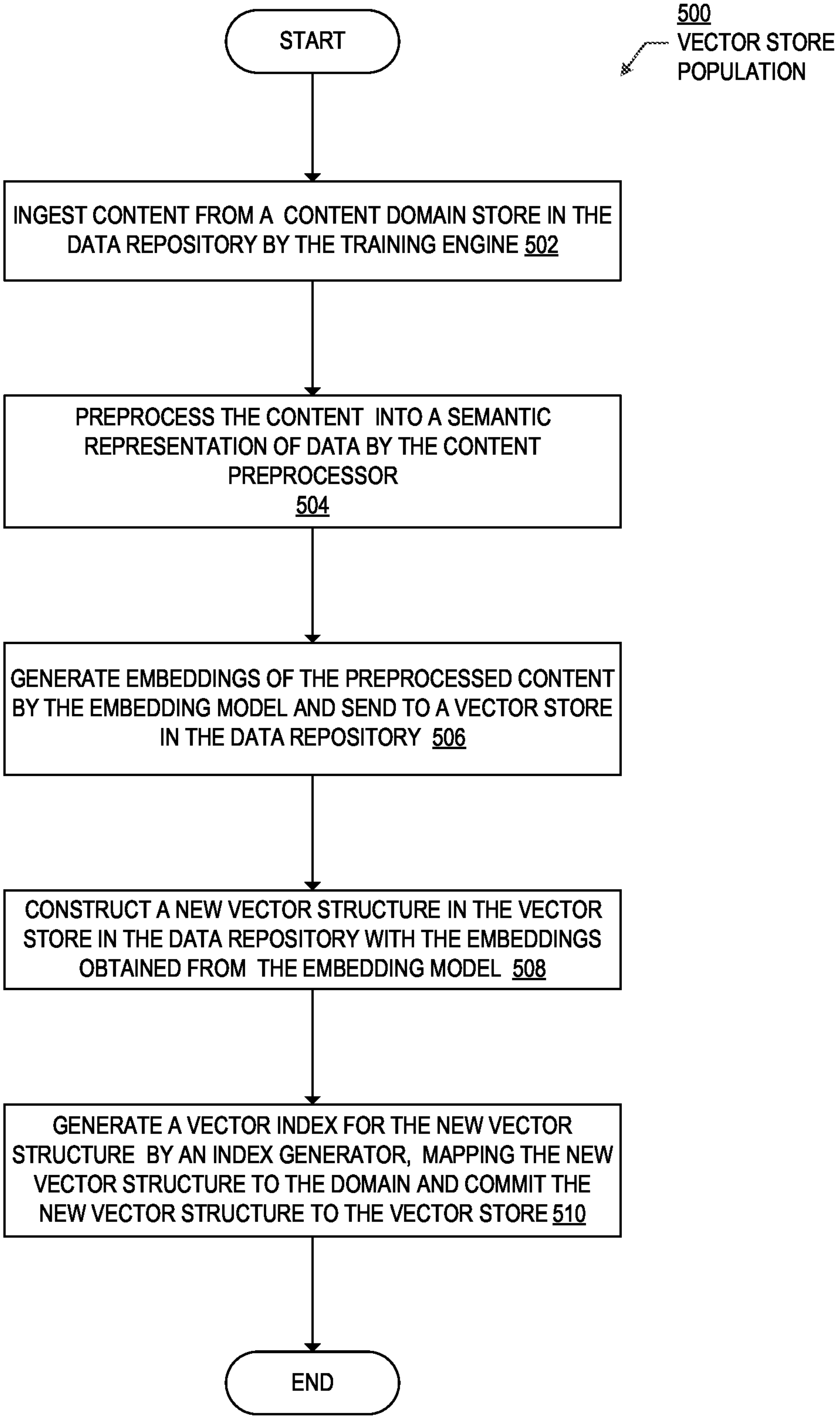
FIG. 5 is a flowchart for populating a vector store with vector structures characterizing a domain corpus, in accordance with one or more embodiments.

FIG. 5 shows a flowchart for a method 500 for populating a vector store. The method 500 may be performed during a population phase. In the population phase, the vector store is initialized and populated with embeddings pertaining to different content domain stores present in the data repository. The method 500 is described in reference to the components shown in FIG. 1. More particularly, Blocks 506 through 510 may be performed by one or more of the training engine, the content preprocessor, and the vector store.

In Block 502, content from a content domain store is ingested. In one or more embodiments, the training engine may be configured to orchestrate the content preprocessor and the content domain stores to perform Block 502. In Block 504, the ingested content is preprocessed by the content preprocessor. In one embodiment, the content preprocessor performs the steps of cleaning, tokenizing, and converting the content into natural language.

In Block 506, embeddings of the preprocessed content are generated by the embedding model and transmitted to the vector store. In one or more embodiments, the embedding model may generate the embeddings for the preprocessed content. The embedding model generates embeddings for the preprocessed content by mapping the words in each utterance of the content to a vector space where each word is represented by a vector. The vectors are generated using a mathematical algorithm that captures the meaning and context of the words based on their surrounding words in the text. The generated vectors are combined to create an embedding for the utterance. The resulting embedding is a mathematical representation of the utterance that may be used for further analysis or processing. Further, the embedding model generates embeddings for each utterance of the ingested and preprocessed content corresponding to a content domain store. Furthermore, in one embodiment, the training engine is configured to send the generated embeddings to the vector store.

In Block 508, a new vector structure is created by the vector store and the embeddings received from the training engine in Block 504 are added to the new vector structure. The vector structures are depicted in plurality in FIG. 1 as vector structure 1 through vector structure N.

In Block 510, a vector index corresponding to the vector structure created in Block 508 is generated by the index generator and added to the vector structure. The vector index maps the content domain store from Block 502 to the new vector structure from Block 508. By way of example, in FIG. 1, the vector store creates a new vector structure, vector structure 1, and populates vector structure 1 with embeddings 1,2, and the like. The embeddings are generated from utterances from content corresponding to content domain store 1. The index generator generates a new vector index, vector index 1, that identifies content domain store 1. The vector store adds vector index 1 to vector structure 1. In one or more embodiments, the index generator may be a component of the vector store. Subsequently, the vector structure is committed to the vector store. In one embodiment, committing entails adding the vector structure in an atomic transaction into the vector store.

Figure 6:
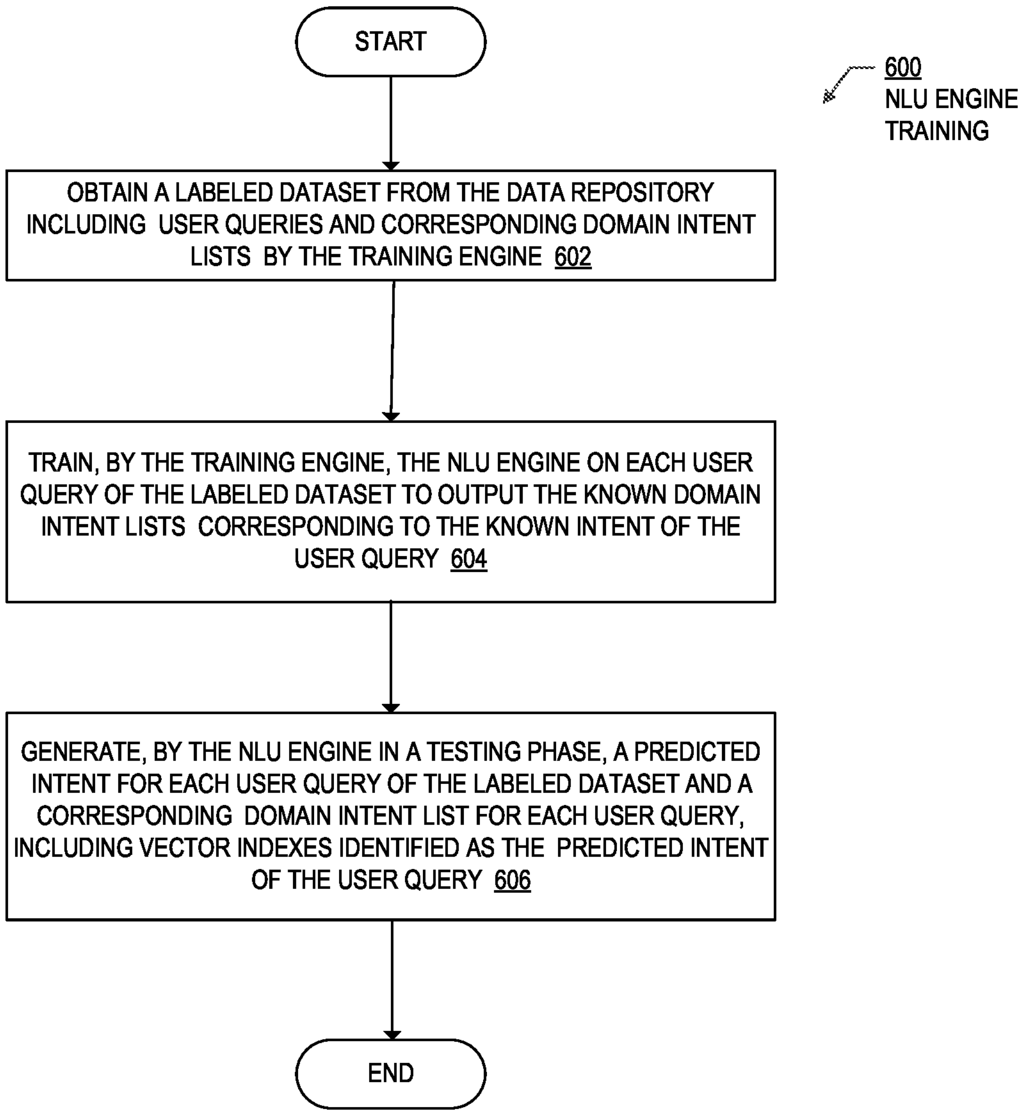
FIG. 6 is a flowchart for training a natural language understanding engine in accordance with one or more embodiments.

Turning to FIG. 6, a flowchart showing a method 600 for NLU engine training is presented. The method 600 is described in reference to the components of FIG. 1. More particularly, Blocks 602 through 604 may be implemented by the training engine and Block 606 may be performed by the NLU engine.

In Block 602, a labeled dataset is obtained from the data repository by the training engine.

In Block 604, the NLU engine is trained by the training engine on each user query of the labeled dataset with a known intent, to produce, as output, a domain intent list including one or more vector indices identified as the known intent of the user query. The one or more vector indices correspond to the vector structures that contain the embeddings corresponding to content in the content domain stores that are identified as the known intent of the user query. In other words, the content domain stores contain content that is relevant to the known intent of the user query.

In Block 606, a predicted domain intent list is generated by the NLU engine for each user query in the labeled dataset in a testing phase. In one embodiment, the NLU engine predicts the intent of the user query in the labeled dataset. The NLU engine subsequently generates the predicted domain intent list. The domain intent list contains one or more vector indices. The one or more vector indices are identified as the predicted intent of the user query. The one or more vector indices correspond to one or more vector structures in the vector store. Each corresponding vector structure contains embeddings corresponding to content from content domain stores, identified by the corresponding vector index as the predicted intent of the user query. In one example, a user query of the labeled dataset may be the request "What's the weather in NYC?". The NLU engine may predict the intent of the user query to be the "Weather" content store. The corresponding domain intent list generated by the NLU engine may contain the vector index "Weather". The vector index identifies a vector structure in the vector store that contains embeddings for the content in the content domain store "Weather". In one or more embodiments, Block 608 may be implemented asynchronously from Blocks 602 through 606 as a test run for the NLU engine. During the test run, the output of the NLU engine is evaluated for accuracy.

Turning to FIG. 7A, an example of the output of the NLU engine is shown. More particularly, in one or more embodiments, the NLU engine may generate the table 705 shown in FIG. 7A in accordance with Block 608 of the method 600. Additionally, in one or more embodiments, the table shown in FIG. 7A may represent an example training set used by the training engine to train the NLU engine in accordance with Block 604 of method 600. Reference numeral 706 represents example user queries, shown in the column under the heading "Query" in table 705. In a similar fashion, reference numeral 708 represents example domain intent lists corresponding to the user queries, shown in the column under the heading "Intent" in tables 705.

FIG. 7B shows an example 712 of a user interaction with an automated response system, more specifically, a chatbot widget. In example 712 shown in FIG. 7B, the user enters a query "What is the status of my package". The user's intent is to track a previously shipped package, however, the user uses the word "status" instead of "track." The NLU engine identifies the semantic intent of the query as a package tracking request and identifies the intended domain of the query as "Package_Tracking." Although the word "status" appears in the user query, the NLU engine accurately determines the intent of the query to be a package tracking query, selecting the domain over another possible domain, namely, "Order_Status". Accordingly, the NLU engine generates the domain intent list and a corresponding confidence score. In the example, the word "package" may be given greater weight in comprehending the semantic intent of the user query, and therefore the corresponding confidence score may be set at 70%. Subsequently, the vector store may be searched for the vector structure corresponding to the vector index "Package_Tracking." Result embeddings from the vector structures that are top K matched to the user query may be obtained. The answer presented to the user is an accurate and relevant response to the user's intent, which is to track a previously shipped package.

The systems and methods described herein provide an improvement to a computer system when specifically configured to implement the system and method. The specific configurations provide a technical solution to the technical problem of inaccurate and non-relevant answer generation by answer generation models, in particular, large language models. Using a natural language understanding model to predict the intent of a user query and based on this intent, searching a vector store for embeddings with high similarity scores, subsequently sending the embeddings as input to answer generation models reduces the latency of the answer generation models in generating an accurate and relevant answer. Further, the continuous feedback training of the natural language understanding model at runtime improves the performance of the natural language understanding model over time in predicting the intent of a user query.

Figure 8A:
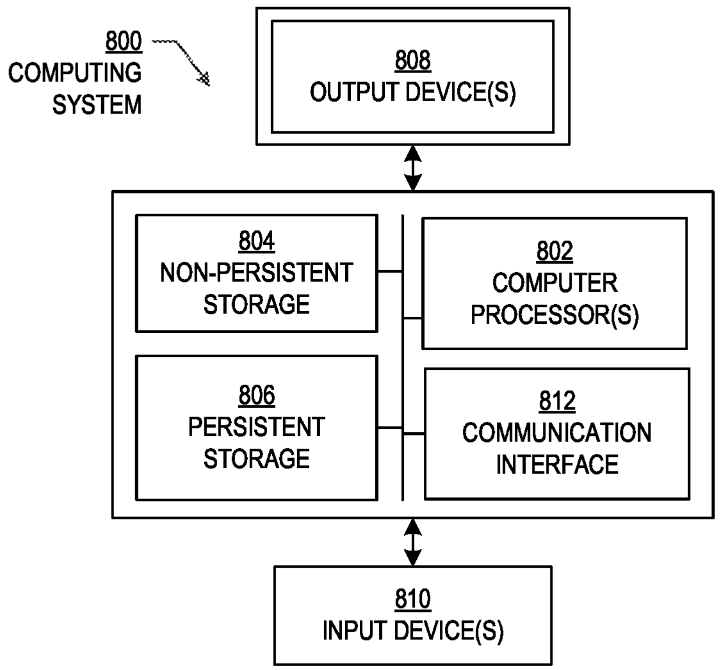
FIG. 8A and FIG. 8B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804), persistent storage (806), a communication interface (808) (e.g., Bluetooth interface, infrared interface, network interface, optical interface, etc.), and numerous other elements and functionalities that implement the features and elements of the disclosure. The computer processor(s) (802) may be an integrated circuit for processing instructions. The computer processor(s) may be one or more cores or micro-cores of a processor. The computer processor(s) (802) includes one or more processors. The one or more processors may include a central processing unit (CPU), a graphics processing unit (GPU), a tensor processing unit (TPU), combinations thereof, etc.

The input devices (810) may include a touchscreen, keyboard, mouse, microphone, touchpad, electronic pen, or any other type of input device. The input devices (810) may receive inputs from a user that are responsive to data and messages presented by the output devices (812). The inputs may include text input, audio input, video input, etc., which may be processed and transmitted by the computing system (800) in accordance with the disclosure. The communication interface (808) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the output devices (812) may include a display device, a printer, external storage, or any other output device. One or more of the output devices may be the same or different from the input device(s). The input and output device(s) may be locally or remotely connected to the computer processor(s) (802). Many different types of computing systems exist, and the aforementioned input and output device(s) may take other forms. The output devices (812) may display data and messages that are transmitted and received by the computing system (800). The data and messages may include text, audio, video, etc., and include the data and messages described in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 8B:
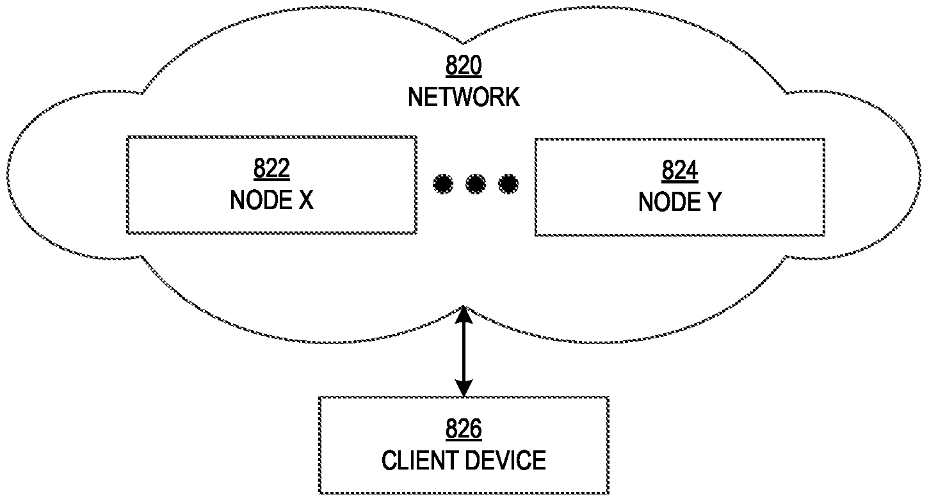

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826), including receiving requests and transmitting responses to the client device (826). For example, the nodes may be part of a cloud computing system. The client device (826) may be a computing system, such as the computing system shown in FIG. 8A. Further, the client device (826) may include and/or perform all or a portion of one or more embodiments.

The computing system of FIG. 8A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:

generating, by an embedding model, a user query embedding for a user query received from a user;

generating, by a natural language understanding (NLU) engine processing the user query embedding, a domain intent list comprising at least one vector index;

determining, by the NLU engine, a confidence score of the domain intent list comprising the at least one vector index, based on the user query embedding;

selecting, by a user query answer service, from a plurality of vector structures in a vector store, at least one vector structure corresponding to the at least one vector index to obtain a set of selected vector structures;

performing vector searching of the set of selected vector structures to identify at least one result embedding matching the user query embedding;

transmitting, by the user query answer service to an answer generation model, the user query and the at least one result embedding; and receiving, by the user query answer service from the answer generation model, an answer to the user query;

generating, by the vector store, at least one result similarity score corresponding to the at least one result embedding:

determining, by the user query answer service, an index similarity score corresponding to the at least one vector index based on the at least one result similarity score;

determining, by the user query answer service, a composite score corresponding to the at least one vector index based on the confidence score of the domain intent list and the index similarity score corresponding to the at least one vector index; and initiating, by a feedback training service, at least one feedback training for the NLU engine responsive to the composite score being lower than a composite score threshold, wherein the at least one feedback training comprises:

obtaining, from the user query answer service, a selected relevant result embedding corresponding to at least one selected relevant result corresponding to the user query, obtaining, by the feedback training service, a relevant vector index corresponding to a vector structure of the plurality of vector structures, the vector structure storing the selected relevant result embedding, and training, by the feedback training service, the NLU engine with the user query to output the relevant vector index corresponding to the vector structure storing the selected relevant result embedding.

2. The method of claim 1, further comprising:

populating, by a training engine, the vector store during a populating phase, wherein populating the vector store comprises:

ingesting, by the training engine, content corresponding to at least one content domain store from a data repository, preprocessing the content, by a content preprocessor, generating, by the embedding model, at least one embedding corresponding to at least one utterance of the content, and transmitting the at least one embedding to the vector store.

3. The method of claim 2, further comprising:

creating, by the vector store, a new vector structure comprising:

the at least one embedding corresponding to the at least one utterance of the content, and a new vector index corresponding to the new vector structure, wherein the new vector index is generated by an index generator; and committing, by the vector store, the new vector structure to the vector store.

4. The method of claim 1, further comprising:

training, by a training engine, the NLU engine during a training phase, comprising:

obtaining a labeled dataset from a data repository, wherein the labeled dataset comprises:

at least one previously received user query, and at least one previously generated domain intent list corresponding to the previously received user query, wherein the previously generated domain intent list comprises at least one vector index identified as a known intent of the previously received user query, and training, by the training engine, the NLU engine on the at least one previously received user query, to output the previously generated domain intent list.

5. The method of claim 4, further comprising:

generating, by the NLU engine, a predicted intent of the at least one previously received user query; and generating, by the NLU engine, during a testing phase of the training, a second domain intent list corresponding to the at least one previously received user query, wherein the second domain intent list comprises at least one vector index identified as the predicted intent of the previously received user query embedding.

6. The method of claim 1, further comprising:

obtaining, from the vector store, at least one alternative result embedding, wherein the at least one alternative result embedding matches the user query, and generating, by the answer generation model, the answer to the user query, based on the at least one alternative result embedding, and responsive to the composite score being lower than the composite score threshold.

7. A system, comprising:

at least one computer processor;

a user query answer service, comprising:

a natural language understanding (NLU) engine; and an embedding model;

a data repository, comprising:

a user query repository;

a vector store configured to cause the at least one computer processor to generate at least one result similarity score corresponding to at least one result embedding; and at least one content domain store;

an answer generation model, wherein:

the embedding model is configured to cause the at least one computer processor to generate, a user query embedding for a user query received from a user, the NLU engine is configured to cause the at least one computer processor to:

process the user query embedding by generating, a domain intent list comprising at least one vector index, and determine a confidence score of the domain intent list comprising the at least one vector index, based on the user query embedding, the user query answer service is configured to cause the at least one computer processor to:

select, from a plurality of vector structures in the vector store, at least one vector structure corresponding to the at least one vector index to obtain a set of selected vector structures, obtain, from the set of selected vector structures, the at least one result embedding, wherein the at least one result embedding matches the user query embedding, determine an index similarity score corresponding to the at least one vector index based on the at least one result similarity score, determine a composite score corresponding to the at least one vector index based on the confidence score of the domain intent list and the index similarity score corresponding to the at least one vector index, transmit, to the answer generation model, the user query and the at least one result embedding, and receive, from the answer generation model, an answer to the user query, the answer generation model is further configured to cause the at least one computer processor to generate the answer to the user query, based on the at least one result embedding from the vector structure, of the set of selected vector structures, corresponding to the at least one vector index and responsive to the composite score being higher than a composite score threshold; and a feedback training service, configured to cause the at least one computer processor to:

initiate at least one feedback training for the NLU engine responsive to the composite score being lower than a composite score threshold, wherein the at least one feedback training comprises:

obtaining, from the user query answer service, a selected relevant result embedding corresponding to at least one selected relevant result corresponding to the user query, obtaining, by the feedback training service, a relevant vector index corresponding to a vector structure, of the plurality of vector structures, storing the selected relevant result embedding, and training, by the feedback training service, the NLU engine on the user query to output the relevant vector index corresponding to the vector structure storing the selected relevant result embedding.

8. The system of claim 7, wherein:

the user query answer service is further configured to cause the at least one computer processor to:

obtain, from the vector store, at least one alternative result embedding wherein the at least one alternative result embedding matches the user query; and the answer generation model is further configured to cause the at least one computer processor to:

generate an answer to the user query, based on the at least one alternative result embedding, and responsive to the composite score being lower than the composite score threshold.

9. The system of claim 7, further comprising:

an index generator configured to generate the at least one vector index; and the training engine further configured to:

populate the vector store during a populating phase, wherein populating comprises:

ingesting, by the training engine, content corresponding to at least one content domain store from the data repository;

preprocessing the content, by a content preprocessor;

generating, by the embedding model, at least one embedding corresponding to at least one utterance of the content; and transmitting the at least one embedding to the vector store, wherein the vector store is configured to:

create a new vector structure comprising:

the at least one embedding corresponding to the at least one utterance of the content, and a new vector index corresponding to the new vector structure wherein the new vector index is generated by the index generator, and commit the new vector structure to the vector store.

* * * * *